United States Patent
Girgis

[19]

[11] Patent Number: 6,051,314
[45] Date of Patent: Apr. 18, 2000

[54] COATINGS FOR FIBER STRANDS, COATED FIBER STRANDS, REINFORCED COMPOSITES, ASSEMBLIES AND METHOD OF REINFORCING THE SAME

[75] Inventor: Mikhail M. Girgis, Wexford, Pa.

[73] Assignee: PPG Industries Ohio, Inc., Cleveland, Ohio

[21] Appl. No.: 08/852,893

[22] Filed: May 8, 1997

Related U.S. Application Data

[63] Continuation of application No. 08/697,758, Aug. 29, 1996, abandoned.

[51] Int. Cl.[7] .................................................. D02G 3/00
[52] U.S. Cl. ...................... 428/375; 428/361; 428/364; 428/378; 428/391; 428/392; 428/403; 428/423.1; 525/66; 525/129; 525/170
[58] Field of Search .................................. 428/361, 364, 428/375, 378, 391, 392, 403, 423.1; 525/66, 129, 170

[56] References Cited

U.S. PATENT DOCUMENTS

| | | | |
|---|---|---|---|
| 2,881,732 | 4/1959 | Chrystman | 118/33 |
| 2,929,738 | 3/1960 | Bateson et al. | 117/103 |
| 3,014,453 | 12/1961 | Bateson et al. | 118/58 |
| 3,713,925 | 1/1973 | Hartzell et al. | 156/78 |
| 3,755,009 | 8/1973 | Uffner | 117/126 GB |
| 3,844,821 | 10/1974 | Lanik | 117/72 |
| 3,869,308 | 3/1975 | Graham | 117/126 GB |
| 3,956,565 | 5/1976 | Bolen et al. | 428/378 |
| 4,619,854 | 10/1986 | Penttinen | 428/99 |
| 4,663,231 | 5/1987 | Girgis et al. | 428/378 |
| 4,762,750 | 8/1988 | Girgis et al. | 428/378 |
| 4,762,751 | 8/1988 | Girgis et al. | 428/378 |
| 4,932,108 | 6/1990 | Brodmann | 28/271 |
| 5,197,202 | 3/1993 | Jensen | 34/23 |
| 5,466,528 | 11/1995 | Girgis | 428/391 |
| 5,601,910 | 2/1997 | Murphy et al. | 442/79 |
| 5,646,207 | 7/1997 | Schell | 524/47 |
| 5,670,255 | 9/1997 | Temple et al. | 428/392 |
| 5,804,313 | 9/1998 | Schell | 428/391 |
| 5,824,413 | 10/1998 | Schell | 428/378 |
| 5,827,612 | 10/1998 | Girgis | 428/378 |

FOREIGN PATENT DOCUMENTS

| | | |
|---|---|---|
| 2753669 | 10/1978 | Germany . |
| 3-69532 | 3/1991 | Japan . |
| 5-015602 | 1/1993 | Japan . |
| 6-285942 | 10/1994 | Japan . |
| 1 362 280 | 8/1974 | United Kingdom . |
| 1 522 474 | 8/1978 | United Kingdom . |
| 95/23120 | 8/1995 | WIPO . |
| 96/33307 | 10/1996 | WIPO . |
| WO98/08777 | 3/1998 | WIPO . |

OTHER PUBLICATIONS

Textile Terms and Definitions, The Textile Institute (9th Ed. 1991) pp. 35–36.

(List continued on next page.)

*Primary Examiner*—William Krynski
*Assistant Examiner*—B. Shewareged
*Attorney, Agent, or Firm*—Andrew C. Siminerio; Ann M. Cannoni

[57] ABSTRACT

The present invention provides aqueous secondary coating compositions adapted to coat a sized fiber strand, the compositions including a urethane-containing polymer and a blend of a halogenated vinyl polymer and an elastomeric polymer. Another aspect of the present invention is a generally tubular assembly having a reinforcement coated with a primary layer of a sizing composition including a fiber lubricant which provides the assembly with an electrical resistance of greater than about 750 megaohms per 152±13 millimeters of length of the assembly and a secondary layer including a halogenated vinyl homopolymer and a urethane-containing polymer. Another aspect of the present invention is a fiber strand formed from a thermoplastic or thermosetting material having a primary layer including a halogenated vinyl homopolymer and a urethane-containing polymer. The present invention also includes strands coated with the above-discussed coatings and polymeric composites and assemblies reinforced with the same.

15 Claims, 4 Drawing Sheets

OTHER PUBLICATIONS

"Textile Polymers and Chemicals Product Selection Guide", Technical Bulletin of BF Goodrich (May 1995) pp. 7–8.

"VYCAR™ Polyvinyl Chloride Emulsions", a Technical Bulletin of BF Goodrich (May 1994) pp. 2, 13–17.

"Technical Data VYCAR™ 552", a Technical Bulletin of BF Goodrich (Aug. 1994).

"BF Goodrich Emulsion Polymer Selection Guide", a Technical Bulletin of BF Goodrich (1995).

"High Performance Emulsions for Nonwovens", a Technical Bulletin of BF Goodrich (1995).

"Technical Data VYCAR™ 580×83", a Technical Bulletin of BF Goodrich (Aug. 1994).

"Technical Data VYCAR™ 352", a Technical Bulletin of BF Goodrich (Aug. 1994).

Hawley's Condensed Chemical Dictionary, (12th Ed. 1993), pp. 1075, 461, 435, 331, 1215–16, 455, 851–852, 942.

Encyclopedia of Polymer Science and Technology, vol. 14 (1971) pp. 313–316, 345–350, 353–357, 396–397, vol. 2 (1965) 703–706, vol. 6 (1967) pp. 505–712.

Kirk–Othmer, Encyclopedia of Chemical Technology, (2d Ed.) vol. 21, pp. 369–377, 379, 56–69, vol. 1 (1963) 203–205, 259–297, 305–307, vol. 7 (1965), pp. 676, 679–686, 693–698, vol. 17 (1968), pp. 543–544.

PN–3716K Technical Data Sheet of H.B. Fuller Co. (Jul. 25, 1994).

PN–3716–L1 Technical Data Sheet of H.B. Fuller Co. (Jul. 25, 1994).

"Building Better Nonwovens", a Technical Bulletin of Rohm & Haas Specialty Industrial Polymers (1994).

K. Loewenstein, *The Manufacturing Technology of Continuous Glass Fibres,* (3d ed. 1993), pp. 237–289, 30–44, 47–60, 115–122, 126–135, 165–172, 219–222.

I. Rubin, *Handbook of Plastic Materials and Technology,* (1990) pp. 955–1062, 1179–1215, 1225–1271.

COATINGS FOR FIBER STRANDS, COATED FIBER STRANDS, REINFORCED COMPOSITES, ASSEMBLIES AND METHOD OF REINFORCING THE SAME

CROSS REFERENCE TO RELATED APPLICATION

This application is a continuation of Ser. No. 08/697,758 Aug. 29, 1996, now abandoned.

This patent application is related to U.S. patent application Ser. No. 08/697,758 of Mikhail M. Girgis entitled "COATINGS FOR FIBER STRANDS, COATED FIBER STRANDS, REINFORCED COMPOSITES, ASSEMBLIES AND METHOD OF REINFORCING THE SAME".

FIELD OF THE INVENTION

This invention relates generally to reinforcements for multilayered assemblies or composites and, more specifically, to fiber strands coated with (1) a blend of a halogenated vinyl polymer and an elastomeric polymer and (2) a urethane-containing polymer for reinforcing multilayered assemblies or composites.

BACKGROUND OF THE INVENTION

Reinforced multiple-ply hoses, for example those which are used to convey pneumatic fluids such as hydraulic oils, are often subjected to bending, twisting and physical environments which can cause deterioration of the hose materials and separation of the hose plies. Coatings on the reinforcement material can promote adhesion and compatibility between the reinforcement and the adjacent plies of the hose.

U.S. Pat. No. 4,663,231 discloses an aqueous impregnating coating composition for glass fibers which includes an aqueous soluble, dispersible or emulsifiable elastomeric ethylene-containing interpolymer which has a glass transition temperature of around 0° C. or less (see column 4, lines 38–54); one or more crosslinkable materials; a crosslinking controlling agent; wax, a plasticizer and a diene-containing elastomeric polymer.

U.S. Pat. No. 4,762,750 discloses an aqueous impregnating coating composition for glass fibers which includes an aqueous soluble, dispersible or emulsifiable elastomeric polymer that is essentially free of any hydrocarbon diene functionality and essentially free of any chlorine functionality (see column 5, lines 58–63), such as elastomeric ethylene-containing interpolymers having a glass transition temperature of around 0° C. or less (see column 6, lines 21–38), elastomeric polyurethanes, elastomeric silicones, fluororubbers, polysulfide rubbers, ethylene-propylene rubber or polyethers; a crosslinking material; and optionally a wax, plasticizer and diene-containing elastomeric polymer.

There is a need for a coating for fiber reinforcements, such as glass fiber reinforcements, which provides adequate adhesion and compatibility between the reinforcement and adjacent materials, such as polyethylene or polyurethane hose plies, and superior performance characteristics such as high electrical resistance.

SUMMARY OF THE INVENTION

The present invention provides an aqueous secondary coating composition adapted to coat a fiber strand having thereon a primary layer of a sizing composition which is different from the secondary coating composition, the secondary coating composition comprising: (a) a blend of (1) a halogenated vinyl polymer; and (2) an elastomeric polymer, the blend being essentially free of a monoolefinic material; and (b) a urethane-containing polymer different from the elastomeric polymer.

Another aspect of the present invention is a fiber strand having applied to at least a portion of a surface thereof a primary layer of a sizing composition and thereupon a secondary layer of an aqueous secondary coating composition different from the sizing composition, the secondary coating composition comprising: (a) a blend of (1) a halogenated vinyl polymer; and (2) an elastomeric polymer, the blend being essentially free of a monoolefinic material; and (b) a urethane-containing polymer different from the elastomeric polymer.

Another aspect of the present invention is a fiber strand having applied to at least a portion of a surface thereof a primary layer of a sizing composition and thereupon a secondary layer of an aqueous secondary coating composition different from the sizing composition, the secondary coating composition comprising: (a) a blend of (1) a vinyl chloride copolymer; and (2) an acrylonitrile-butadiene copolymer, the blend being essentially free of a monoolefinic material; and (b) a urethane-containing polymer.

Another aspect of the present invention is a reinforced polymeric composite comprising: (a) a fiber strand reinforcing material, at least a portion of a surface of the fiber strand reinforcing material having applied thereto a primary layer of a sizing composition and thereupon a secondary layer of an aqueous secondary coating composition comprising: (1) a blend of (i) a halogenated vinyl polymer; and (ii) an elastomeric polymer, the blend being essentially free of a monoolefinic material; and (2) a urethane-containing polymer different from the elastomeric polymer; and (b) a polymeric matrix material.

The present invention also provides an aqueous secondary coating composition adapted to coat a fiber strand having thereon a primary layer of a sizing composition which is different from the secondary coating composition, the secondary coating composition comprising: (a) a halogenated vinyl homopolymer; (b) an elastomeric polymer; and (c) a urethane-containing polymer different from the elastomeric polymer.

Another aspect of the present invention is an aqueous secondary coating composition adapted to coat a fiber strand having thereon a primary layer of a sizing composition which is different from the secondary coating composition, the secondary coating composition comprising: (a) a halogenated vinyl homopolymer; (b) a urethane-containing polymer; and (c) a wax material.

Another aspect of the present invention is an aqueous secondary coating composition adapted to coat a fiber strand having thereon a primary layer of a sizing composition which is different from the secondary coating composition, the secondary coating composition comprising: (a) a halogenated vinyl polymer; and (b) a water soluble, emulsifiable or dispersible curable acrylic polymer.

Another aspect of the present invention is a reinforced generally tubular assembly comprising: (a) a first layer formed from a polymeric material, the first layer having an inner surface and an outer surface; (b) a reinforcement layer having an inner surface and an outer surface, the inner surface of the reinforcement layer being positioned adjacent to the outer surface of the first layer, the reinforcement layer comprising an assembly of coated fiber strands having applied to at least a portion of a surface thereof a primary layer of a sizing composition and thereupon a secondary layer of an aqueous secondary coating composition different from the sizing composition, the sizing composition comprising: (1) a film-forming material; (2) a fiber lubricant adapted to provide the tubular assembly with an electrical resistance of greater than about 750 megaohms per 152±13 millimeters of length of the tubular assembly; and (3) a coupling agent; and the secondary coating composition comprising: (1) a halogenated vinyl homopolymer; and (2) a urethane-containing polymer; and (c) an outer layer formed from a polymeric material, the outer layer being positioned adjacent to the outer surface of the reinforcement layer to form a generally tubular assembly.

Another aspect of the present invention is a fiber strand formed from a material selected from the group consisting of a thermoplastic material and a thermosetting material, the fiber strand having applied to at least a portion of a surface thereof a primary coating composition comprising: (a) a halogenated vinyl homopolymer; and (b) a urethane-containing polymer.

The present invention also includes strands coated with the above-discussed coatings, polymeric composites and assemblies reinforced with the same and a method for reinforcing a generally tubular assembly.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

The aqueous secondary coating compositions of the present invention are adapted to coat a fiber strand or roving having thereon a primary layer of a sizing composition, which is preferably at least partially dried. The coated fiber strands of the present invention are adapted to reinforce polymeric composites and multi-layered assemblies such as hoses. As used herein, the term "strand" means a plurality of individual fibers. The term "fibers" means a plurality of individual filaments.

Figure 1:
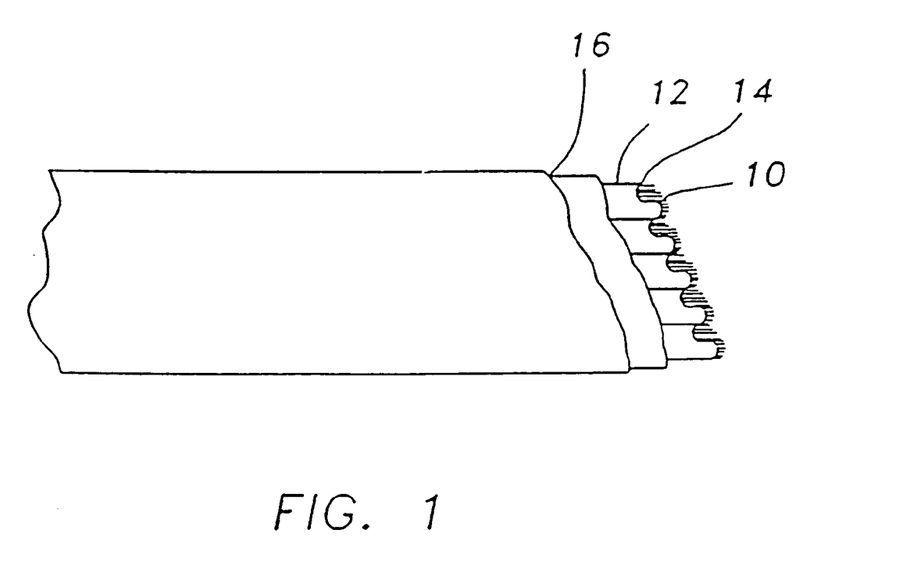
FIG. 1 is an enlarged front elevational view of a plurality of fiber strands having a secondary coating and a tertiary coating according to the present invention.

A fiber strand 10 of the present invention, shown in FIG. 1, has a primary layer of an essentially dried residue of a sizing composition 12 on at least a portion of its surface 14 to protect the surface 14 from abrasion during processing. As used herein, the terms "size", "sized" or "sizing" refer to the composition applied to the fibers immediately after formation of the fibers. Suitable sizing compositions for use in the present invention will be discussed in detail below.

The term "secondary coating" 16 refers to a coating composition applied as a secondary layer over at least a portion of the primary layer of the at least partially dried sizing composition 12. The secondary coating composition is different from the sizing composition, i.e., the secondary coating composition (1) contains at least one component which is chemically different from the components of the sizing composition; or (2) contains at least one component in an amount which is different from the amount of the same component contained in the sizing composition. For example, the secondary coating composition can contain a thermoplastic polyurethane and the sizing composition can contain a chemically different thermosetting polyurethane. In another example, the secondary coating composition and sizing can each contain the same thermoplastic polyurethane but in different amounts.

Broadly stated, the secondary coating compositions of the present invention are preferably aqueous-based and include components which are water soluble, emulsifiable or dispersible. The components of the secondary coating compositions can also be curable.

As used herein, the term "water soluble" means that any of the components of the secondary coating composition are capable of being essentially uniformly blended and/or molecularly or ionically dispersed in water to form a true solution. See *Hawley's Condensed Chemical Dictionary*, (12th Ed. 1993) at page 1075, which is hereby incorporated by reference.

The term "emulsifiable" as used herein means that any of the components of the secondary coating composition are capable of forming an essentially stable mixture or being suspended in water in the presence of an emulsifying agent. See *Hawley's* at page 461, which is hereby incorporated by reference. Non-limiting examples of suitable emulsifying agents are set forth below.

The term "dispersible" means that any of the components of the secondary coating composition are capable of being distributed throughout water as finely divided particles, such as a latex. See *Hawley's* at page 435, which is hereby incorporated by reference. The uniformity of the dispersion can be increased by the addition of wetting, dispersing or emulsifying agents (surfactants), which are discussed below.

As used herein, the term "curable" means (1) any of the components of the secondary coating composition are capable of being at least partially dried by air and/or heat; and/or (2) any of the components of the secondary coating composition, other components of the secondary coating composition and/or fibers are capable of being crosslinked to each other to change the physical properties of the component of the secondary coating composition. See *Hawley's* at page 331, which is hereby incorporated by reference.

In a preferred embodiment, the aqueous secondary coating composition of the present invention comprises a blend of (1) one or more halogenated vinyl polymers; and (2) one or more elastomeric polymers, the blend being essentially free of a monoolefinic material. As used herein, the terms "blend" or "polyblend" mean a uniform combination of (a) one or more halogenated vinyl polymers and (b) one or more elastomeric polymers. See *Hawley's* at page 157, which is hereby incorporated by reference.

The halogenated vinyl polymer can be a homopolymer, copolymer or multipolymer formed by the polymerization of one or more types of halogenated vinyl monomers or preformed copolymers of the halogenated vinyl monomers.

Non-limiting examples of preferred halogenated vinyl monomers for forming the halogenated vinyl polymer include vinyl chloride, vinyl fluoride, vinylidene chloride, vinylidene fluoride and mixtures thereof. Vinyl monomers of other halogens of group VIIA of the Periodic Table, such as bromine, iodine, astatine and mixtures thereof, can also be used.

As used herein, the term "mixture" means a heterogeneous association of substances which cannot be represented by a single chemical formula and which may or may not be uniformly dispersed and can usually be separated by mechanical means. See Hawley's at page 788–789, which are hereby incorporated by reference.

For information regarding methods for forming halogenated vinyl monomers, see Hawley's Condensed Chemical Dictionary, (12th Ed. 1993) at pages 1215–1216 and Encyclopedia of Polymer Science and Technology, (1971) Volume 14 at pages 313–316, which are hereby incorporated by reference.

Examples of polymerization methods for forming the halogenated vinyl polymer(s) from the halogenated vinyl monomer(s) include bulk polymerization in the presence of a free radical initiator, emulsion polymerization, suspension polymerization and solution and precipitation polymerization. For more information regarding methods for polymerizing halogenated vinyl monomers, see Kirk-Othmer, Encyclopedia of Chemical Technology, (2d Ed. 1970) Volume 21 at pages 369–377, which are hereby incorporated by reference.

Examples of suitable halogenated vinyl polymers include polyvinyl chloride, polyvinyl fluoride, vinylidene chloride, vinylidene fluoride, mixtures thereof and copolymers thereof. Preferably, the halogenated vinyl polymer is polyvinyl chloride or a copolymer of polyvinyl chloride and vinylidene chloride.

Such polymers can be emulsified with any conventional emulsifier well known to those skilled in the art and such as are discussed below. Non-limiting examples of useful emulsified halogenated vinyl polymers include VYCAR™ 351, 352, 460X95, 575X43, 576, 577, 580X83, 580X158, 580X175, 590X4 vinyl chloride polymer and copolymer emulsions and YCAR™ 650X18 and 660X14 vinylidene chloride copolymer emulsions, which are commercially available from B. F. Goodrich.

For example, VYCAR™ 352 vinyl chloride copolymer emulsion has a glass transition temperature of about +69° C., a specific gravity of 1.16, a pH of about 10.3 to about 10.5, a surface tension of about 39 dynes per centimeter, a Brookfield LVF viscosity of about 20 centipoise at 25° C. using Spindle No.1 at 60 revolutions per minute (rpm), an average total solids of about 57 weight percent and includes an anionic emulsifier, according to the supplier.

Another example of a useful vinyl chloride copolymer emulsion is VYCAR™ 580X83, which is plasticized with di-isodecyl phthalate and has a glass transition temperature of about +17° C., a specific gravity of 1.14, a pH of about 10.0, a surface tension of about 35 dynes per centimeter, a Brookfield viscosity of about 30 centipoise at 25° C. using Spindle No. 2 at 60 rpm, an average total solids of about 56 weight percent and also includes an anionic emulsifier, according to the supplier.

For more information regarding useful commercially available halogenated vinyl polymers, see "VYCAR™ Polyvinyl Chloride Emulsions", a Technical Bulletin of B. F. Goodrich Company (May 1994) at pages 2 and 13–17; "Textile Polymers and Chemicals Product Selection Guide" A Technical Bulletin of B. F. Goodrich Co. (May 1995) at pages 7–8; "BFGoodrich Emulsion Polymer Selection Guide", a Technical Bulletin of B. F. Goodrich Co. (1994); "Technical Data VYCAR™ 352", a Technical Bulletin of B. F. Goodrich Co. (August 1994); and "Technical Data VYCAR™ 580X83", a Technical Bulletin of B. F. Goodrich (August 1994), which are hereby incorporated by reference.

Other materials which can be copolymerized with the halogenated vinyl polymer include vinyl esters such as vinyl acetate, acrylic esters such as methyl acrylate, ethyl acrylate and n-butyl acrylate, vinyl ethers such as cetyl vinyl ether or lauryl vinyl ether and maleic and fumaric esters. For more information, see Encyclopedia of Polymer Science and Technology, (1971) Volume 14 at pages 347–350 and 353–357, which are hereby incorporated by reference.

One or more plasticizers for the halogenated vinyl polymer can be included in the aqueous secondary coating composition. Non-limiting examples of suitable plasticizers include phthalates (such as di-isodecyl phthalate, a preferred plasticizer, di-2-ethyl hexyl phthalate, diisooctyl phthalate); phosphates (such as trixylyl phosphate and tricresyl phosphate); esters of aliphatic dibasic acids (adipates such as dioctyl adipate); polyesters; and trimellitates, such as trioctyl trimellitate. See Encyclopedia of Polymer Science and Technology, Volume 14 (1971) at pages 396–397, which are hereby incorporated by reference.

The amount of plasticizer can be about 10 to about 40 weight percent of the aqueous secondary coating composition on a total solids basis, and is more preferably about 20 to about 30 weight percent.

The aqueous secondary coating composition of the present invention also comprises one or more elastomeric polymers. As used herein, "elastomeric polymer" is a polymer which is capable of recovery from large deformations quickly and forcibly and has the ability to be stretched to at least twice its original length and to retract very rapidly to approximately its original length when released. See Hawley's at page 455 and Kirk-Othmer, Volume 7 (1965) at page 676, which are hereby incorporated by reference.

Suitable elastomeric polymers useful in the present invention for blending with the halogenated vinyl polymer include diolefins, such as polyisoprene, polybutadiene, polychloroprenes (neoprenes), styrene-butadiene copolymers, acrylonitrile-butadiene copolymers and styrene-butadiene-vinylpyridine terpolymers. Other elastomeric polymers useful in the present invention include fluoroelastomers, polysulfides, silicone rubbers, polyacrylates and polyurethanes which are different from the urethane-containing polymer discussed below.

Preferably, the elastomeric polymer is a diolefin such as an acrylonitrile-butadiene copolymer or nitrile rubber. Suitable nitrile rubbers generally contain about 50 to about 82% butadiene. An example of a suitable acrylonitrile-butadiene copolymer is HYCAR G-17, which is commercially available from B. F. Goodrich Chemical Co. of Cleveland, Ohio.

Polyisoprene is the main component of natural rubber. Suitable synthetic polyisoprene is commercially available from Shell Chemical Co. of Houston, Tex. Polybutadiene useful in the present invention generally has about 92 to about 97% cis-1,4-polybutadiene. Suitable chloroprenes (neoprenes) are emulsion polymers of 2-chloro-1,3-butadiene. Suitable styrene-butadiene copolymers generally contain about 71 to about 77% butadiene.

Suitable fluoroelastomers are rubbers containing fluorine, hydrogen and carbon, such as copolymers of vinylidene fluoride and chlorotrifluoroethylene (which are commercially available as Kel-F elastomers from Minnesota Mining and Manufacturing Co. (3M) of Minnesota) and copolymers of perfluoropropylene and vinylidene fluoride (which are commercially available from as VITON copolymers from E. I. duPont de Nemours & Co., Inc. of Wilmington, Del. and FLUOREL copolymers from 3M). Other useful fluoroelastomers include fluoroacrylates, fluoropolyesters, fluorinated silicones and fluorinated nitroso elastomers.

Useful polysulfides include NOVOPLAS polysulfides which are commercially available from ICI Americas, Inc. of Wilmington, Del.

Suitable polyacrylate elastomers are copolymers of alkyl acrylic acid esters, such as ethyl and butyl acrylates, and a crosslinking copolymer, such as acrylonitrile or a chlorinated vinyl derivative.

Suitable silicone rubbers are siloxane polymers composed of a central chain of alternating silicon and oxygen atoms with alkyl or aryl groups attached to the silicon atoms.

Suitable polyurethane elastomers can be formed by the condensation reaction of polyfunctional isocyanate-containing materials with linear polyesters or polyethers containing hydroxyl groups (polyols). Useful polyfunctional isocyanate-containing materials are difunctional isocyanates such as toluene diisocyanate, phenylene diisocyanate, dianisidine diisocyanate, diisocyanatodiphenyl methane, bis(p-phenyl isocyanate), bis(p-phenyl) methylene diisocyanate, bis(p-phenyl cyclohexyl) methylene diisocyanate, naphthalene diisocyanate, xylylene diisocyanate, tetramethylxylylene diisocyanate, cyclohexane diisocyanate, hexamethylene diisocyanate, isophorone diisocyanate and dicyclohexylmethane-4,4'diisocyanate.

Useful linear polyesters containing hydroxyl groups can be formed by the reaction of ethylene or propylene glycol with adipic acid. Useful polyethers include polyoxy-1,4-butylene glycol, polyoxy-1,2-propylene glycol and polytetramethylene ether glycol.

A non-limiting example of a suitable polyurethane elastomer is ESTANE, which is commercially available from B. F. Goodrich.

Methods for forming suitable elastomeric polymers are well known to those skilled in the art and further discussion thereof is not believed to be necessary in view of the present disclosure. If more information is needed, see *Kirk-Othmer*, Volume 7 (1965) at pages 679–686 and 693–698 and Volume 17 (1968) at pages 543–544; *Encyclopedia of Polymer Science and Technology*, Volume 2 (1965) at pages 703–706 and *Hawley's* at page 942, which are hereby incorporated by reference.

The halogenated vinyl polymer and elastomeric polymer can be blended by conventional blending equipment such as a mixer. The ratio of halogenated vinyl polymer to elastomeric polymer in the blend can be about 5:95 to about 99:1 based upon the weight of total solids of the blend, is preferably about 50:50 to about 95:5 and is more preferably about 70:30 to about 90:10.

A non-limiting example of a useful commercially available blend of a halogenated vinyl polymer and an elastomeric polymer is VYCAR™ 552 vinyl chloride copolymer and acrylonitrile-butadiene copolymer polyblend emulsion which is commercially available from B. F. Goodrich and has a glass transition temperature of about 4° C., specific gravity of about 1.09, pH of about 10.3, a surface tension of about 36 dynes per centimeter, a Brookfield viscosity of about 17 centipoise at 25° C. using a Spindle No. 1 at 60 rpm, about 55 weight percent average total solids and which includes an anionic emulsifier. See "VYCAR™ Polyvinyl Chloride Emulsions" at page 15 and "Technical Data VYCAR™ 552", a Technical Bulletin of B. F. Goodrich (August 1994), which is hereby incorporated by reference.

Based upon the weight of the total solids of the aqueous secondary coating composition, the blend of the halogenated vinyl polymer and the elastomeric polymer generally comprises about 50 to about 99 weight percent of the aqueous secondary coating composition, preferably comprises about 70 to about 90 weight percent, and more preferably about 80 to about 90 weight percent of the aqueous secondary coating composition.

As used herein, "essentially free of monoolefinic materials" means that the blend preferably contains less than about 5 weight percent and more preferably less than about 1 weight percent of a monoolefinic material (an unsaturated aliphatic hydrocarbon having one double bond. See *Hawley's* at pages 851–852, which are hereby incorporated by reference). Examples of such monoolefinic materials include alkenes, such as ethylene and propylene. Most preferably, the copolymer is free of a monoolefinic material.

The blend preferably has a glass transition temperature greater than zero °C. as measured using a Differential Scanning Calorimeter (DSC), for example a Perkin Elmer Series 7 Differential Scanning Calorimeter, using a temperature range of about –55° C. to about 150° C. and a scanning rate of about 20° C. per minute.

In the preferred embodiment discussed above, the aqueous secondary coating composition also comprises a urethane-containing polymer which is chemically different from the elastomeric polymer, i.e., for example the urethane-containing polymer can be a thermosetting polyurethane and the urethane-containing polymer can be a chemically different thermoplastic polyurethane. In another example, the urethane-containing polymer can be a polyurethane formed from a polyether polyol and the elastomeric polymer can be a polyurethane formed from a polyester polyol.

The phrase "urethane-containing polymer" as used herein means any polymer containing one or more units of the structure (I):

(I)

See *Kirk-Othmer*, Vol. 21 at pages 56–69, which are hereby incorporated by reference. As noted in *Kirk-Othmer*, Vol. 21 at page 57, the terms urethane and polyurethane are commonly used to refer to urethan and polyurethan, respectively. As used herein, the terms "urethane" and "polyurethane" are used to refer to "urethan" and "polyurethan", respectively. Such urethane-containing polymers can be elastomeric, thermoplastic or thermosetting, and either water soluble, or emulsifiable or dispersible with the use of an emulsifying or dispersing agent.

Urethane-containing polymers are typically condensation products of a polyfunctional isocyanate-containing material such as are discussed above and a hydroxyl-containing material such as a polyether polyol or a polyester polyol and include, for example, WITCOBOND® W-290H, W-212 and W-234 thermoplastic polyurethanes which are commercially available from Witco Chemical Corp. of Chicago, Ill. and RUCOTHANE® 2011L thermoplastic polyurethane latex, which is commercially available from Ruco Polymer Corp. of Hicksville, N.Y., which is preferred.

An example of a useful thermosetting polyurethane is BAYBOND XW-110, which is commercially available from Bayer Corp. of Pittsburgh, Pa. A crosslinking agent can be included in the aqueous secondary coating for crosslinking such thermosetting polyurethanes which include reactive groups such as hydroxyl groups. Non-limiting examples of suitable crosslinking agents include melamine formaldehyde, blocked isocyanates such as Baybond XW 116 or XP 7055, epoxy crosslinking agents such as Witcobond XW by Witco Corp. and polyesters such as Baybond XP-7044 or 7056. The Baybond products are commercially available from Bayer of Pittsburgh, Pa. The amount of crosslinking agent can be about 0.0001 to about 10 weight percent of the aqueous secondary coating composition on a total solids basis.

Based upon the weight of the total solids of the aqueous secondary coating composition, the urethane-containing polymer(s) generally comprises about 5 to about 50 weight percent of the aqueous secondary coating composition, preferably comprises about 10 to about 40 weight percent, and more preferably about 10 to about 20 weight percent of the aqueous secondary coating composition.

In an alternative embodiment, the aqueous secondary coating composition comprises (1) one or more halogenated vinyl homopolymers (discussed above); (2) one or more elastomeric polymers (discussed above); and (3) one or more urethane-containing polymers (discussed above) different from the elastomeric polymers. Suitable homopolymers can be formed from the halogenated vinyl monomers discussed above by the methods mentioned above which are well known to those skilled in the art. Suitable elastomeric polymers and urethane-containing polymers also are discussed above.

In another alternative embodiment, the aqueous secondary coating composition comprises (1) one or more halogenated vinyl homopolymers (discussed above); (2) one or more urethane-containing polymers (discussed above); and (3) one or more wax materials such as are discussed in detail below. An elastomeric polymer, such as are discussed above, can also be included in this aqueous secondary coating composition.

In another alternative embodiment, the aqueous secondary coating composition comprises (1) one or more halogenated vinyl polymers, such as are discussed above; and (2) one or more water soluble, emulsifiable or dispersible curable acrylic polymer(s). This aqueous secondary coating composition can further comprise one or more elastomeric polymers which are preferably essentially free of a monoolefinic material and one or more urethane-containing polymers such as are discussed above.

Suitable curable acrylic polymer(s) for this alternative embodiment can be homopolymers, copolymers or multipolymers and can be the addition polymerization products of one or more monomer components comprising one or more acrylic monomers, polymers and/or derivatives thereof (hereinafter "acrylic(s)"). The curable acrylic polymer and the halogenated vinyl polymer component can be present as a copolymer.

Useful acrylic monomers include acrylic acid, methacrylic acid, derivatives and mixtures thereof. Other non-limiting examples of suitable acrylic monomers include esters of acrylic acid and methacrylic acid, such as acrylates and methacrylates, acrylamides, acrylonitriles and derivatives and mixtures thereof. Useful acrylics can have hydroxy and/or epoxy functionality.

Useful esters of acrylic or methacrylic acid include straight chain or branched alkyl or hydroxyalkyl esters of acrylic or methacrylic acid. Useful alkyl esters can contain about 1 to about 24 carbon atoms, and preferably contain about 1 to about 18 carbon atoms. Non-limiting examples of useful alkyl esters include methyl (meth)acrylate, ethyl (meth)acrylates, propyl (meth)acrylates, butyl (meth)acrylates, pentyl (meth)acrylates, hexyl (meth)acrylates, heptyl (meth)acrylates, octyl (meth)acrylates, nonyl (meth)acrylates, decyl (meth)acrylates, dodecyl (meth)acrylates, tetradecyl (meth)acrylates, hexadecyl (meth)acrylates, ethylhexyl (meth)acrylates, lauryl (meth)acrylates, stearyl (meth)acrylates and 2-ethylhexyl (meth)acrylate. Suitable hydroxyalkyl esters include 2-hydroxyethyl (meth)acrylate, 2-hydroxypropyl (meth)acrylate, 3-hydroxypropyl (meth)acrylate and hydroxybutyl (meth)acrylate.

Non-limiting examples of other useful acrylic monomers include glycol acrylates such as ethylene glycol diacrylate, propylene glycol diacrylate, 1,3-propanediol acrylate, 1,4-butanediol acrylate, 1,4-butanediol methacrylate, 1,6-hexanediol diacrylate, neopentyl glycol diacrylate, 1,3-butyleneglycol diacrylate and tetraethylene glycol diacrylate. A useful polyol acrylate is trimethylolpropane triacrylate. Useful epoxy functional acrylates include polyglycidyl acrylates and polyglycidyl methacrylates. Non-limiting examples of suitable acrylamides include methacrylamide, methylolacrylamide, and N-substituted derivatives thereof. Non-limiting examples of suitable acrylonitriles include acrylonitrile and methacrylonitrile.

An addition polymerizable monomer or polymer can be polymerized with the acrylic. Non-limiting examples of addition polymerizable monomers which can be reacted with the acrylic include other vinyl monomers such as vinyl aromatics including styrene, vinyl toluene, alpha methyl styrene, halostyrenes such as chlorostyrene, and vinyl napthalene; dienes including butadienes such as 1,3-butadiene and 2,3-dimethyl-1,3-butadiene; isoprene; and chloroprene; vinyl acetates, block and graft copolymers thereof. Other useful addition polymerizable monomers include amides, such as n-methylol (meth)acrylamide; nitriles; pyrrolidones and olefins such as ethylene. Mixtures of any of the above addition polymerizable monomers are also useful. Preformed polymers of these monomers can also be addition polymerized with the acrylic polymer provided the preformed polymer has addition polymerizable unsaturation.

Methods for polymerizing acrylic monomers with themselves and/or other addition polymerizable monomers and preformed polymers are well known to those skilled in the art of polymers and further discussion thereof is not believed to be necessary in view of the present disclosure. If additional information is needed, such acrylics and polymerization methods are disclosed in *Kirk-Othmer*, Vol. 1 (1963) at pages 203–205, 259–297 and 305–307, which are hereby incorporated by reference.

The number average molecular weight (Mn), as determined by gel permeation chromatography of the acrylic polymer, can be about 200 to about 200,000 and is preferably about 30,000 to about 100,000. The glass transition temperature of the acrylic polymer can be about −40° C. to about 100° C. and is preferably about zero°C. to about 80° C. as measured using a Differential Scanning Calorimeter (DSC), for example a Perkin Elmer Series 7 Differential Scanning Calorimeter, using a temperature range of about −55° C. to about 150° C. and a scanning rate of about 20° C. per minute.

Preferably, the curable acrylic polymer is present in an emulsion including an emulsifying agent, suitable examples of which are discussed below. The curable acrylic polymer is preferably self-crosslinking, although external crosslinking agents can be included in the secondary aqueous coating composition for crosslinking the curable acrylic polymer with itself or other components of the secondary aqueous coating composition, as discussed below. The curable acrylic polymer can be cationic, anionic or nonionic, but preferably is anionic or nonionic.

Non-limiting examples of useful acrylic polymers include Fulatex® materials which are commercially available from H. B. Fuller Co. of St. Paul, Minn. Useful FULATEX® materials include FULATEX® PN-3716G, a butyl acrylate and styrene copolymer and FULATEX® PN-3716L1, a butyl acrylate, styrene and butyl methyl acrylate copolymer. See PN-3716-K and PN-3716-L1 Technical Data Sheets of H. B. Fuller Co. (Jul. 25, 1994), which are hereby incorporated by reference. Other useful FULATEX® materials include FULATEX® PN-3716F, FULATEX® PN-3716H, FULATEX® PN-3716J and FULATEX® PN-3716K.

Other useful curable acrylic polymers include self-crosslinking acrylic emulsions such as RHOPLEX® E-32, E-693, HA-8, HA-12, HA-16, TR-407 and WL-81 emulsions commercially available from the Rohm & Haas Company. See "Building Better Nonwovens", a Technical Bulletin of Rohm and Haas Specialty Industrial Polymers, (1994), which is hereby incorporated by reference. Also useful are the CARBOSET acrylic polymers which are commercially available from B. F. Goodrich Co. of Toledo, Ohio.

Useful acrylic polymers include copolymers of acrylic monomers with vinyl compounds such as n-methylolacrylamide vinyl acetate copolymers and VINOL® vinyl acetate products which are commercially available from Air Products and Chemicals, Inc. of Allentown, Pa.

Yet another suitable acrylic are ethylene acrylic acid copolymers such as MICHEM® PRIME 4990 or MICHEM® PRIME 4983HS, which are commercially available from Michelman Inc. of Cincinnati, Ohio.

The acrylic polymer and halogenated vinyl polymer useful in this alternative embodiment can be present as a copolymer, as discussed above. Suitable copolymers include VYCAR™ 590X20, 460X46, 450X61, 460X45 and 460X49 polyvinyl chloride-acrylic copolymers which are commercially available from B. F. Goodrich.

The amount of the curable acrylic polymer(s) can be about 1 to about 50 weight percent of the secondary aqueous coating composition on a total solids basis, preferably about 5 to about 40 weight percent, and more preferably about 10 to about 30 weight percent.

The aqueous secondary coating compositions of the different embodiments discussed above can further comprise one or more thermoplastic film-forming materials chemically different from the components discussed above.

Examples of suitable thermoplastic film-forming materials include polyolefins, polyesters, vinyl polymers, derivatives and mixtures thereof, to name a few.

Non-limiting examples of useful polyolefins include polypropylene and polyethylene materials such as the polypropylene emulsion RL-5440, which is commercially available from Sybron Chemicals of Birmingham, N.J., and Polyemulsion Chemcor 43C30, which is commercially available from Chemical Corp. of America. Another example of a suitable polyolefin for use in the present invention is the high density polyethylene emulsion Protolube HD which is commercially available from Sybron Chemicals of Birmingham, N.J.

Thermoplastic polyesters useful in the present invention include ethylene adipates (such as Desmophen 2000) and ethylene butylene adipates (such as Desmophen 2001KS), both of which are commercially available from Bayer of Pittsburgh, Pa.

Non-limiting examples of useful vinyl polymers include Resyn 2828 and Resyn 1037 vinyl acetate copolymer emulsions which are commercially available from National Starch, and other polyvinyl acetates such as are commercially available from H. B. Fuller and Air Products and Chemicals Co. of Allentown, Pa. Other useful vinyl polymers include polyvinyl pyrrolidones such as PVP K-15, PVP K-30, PVP K-60 and PVP K-90, each of which are commercially available from ISP Chemicals of Wayne, N.J.

As mentioned above, the aqueous secondary coating composition can include one or more aqueous soluble, emulsifiable or dispersible wax materials. The wax material can be selected from vegetable, animal, mineral, synthetic or petroleum waxes, for example. Preferred waxes are petroleum waxes such as MICHEM® LUBE 296 microcrystalline wax, POLYMEKON® SPP-W microcrystalline wax and PETROLITE 75 microcrystalline wax which are commercially available from Michelman Inc. of Cincinnati, Ohio and the Petrolite Corporation of Tulsa, Okla., respectively. Generally, the amount of wax can be about 1 to about 10 weight percent of the aqueous secondary coating composition on a total solids basis, and preferably about 3 to about 5 weight percent.

The aqueous secondary coating compositions discussed above can include one or more emulsifying agents or surfactants for emulsifying components of the secondary coating composition, such as the halogenated vinyl polymer. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

An example of a suitable polyoxypropylene-polyoxyethylene copolymer is PLURONIC™ F-108, which is commercially available from BASF Corporation of Parsippany, N.J. Examples of useful ethoxylated alkyl phenols include ethoxylated octylphenoxyethanol, phenoxy polyethyleneoxy(ethanol), phenoxy(ethyleneoxy)ethanol and nonyl phenoxy poly(ethyleneoxy)ethanol. An example of a commercially available ethoxylated octylphenoxyethanol is IGEPAL CA-630 from GAF Corporation of Wayne, N.J. An example of a polyoxyethylated vegetable oil is EMULPHOR EL-719, which is commercially available from GAF Corp. A useful polyoxyethylene octylphenyl glycol ether is Triton X-100, which is commercially available from Rohm & Haas of Philadelphia, Pa. Tween 21 and 81, which are available from ICI Americas of Wilmington, Del., and TMAZ 81, which is available from PPG Industries, Inc., are examples of useful ethylene oxide derivatives of sorbitol esters. Other suitable emulsifying agents include NOVEPOX™ or Prox E 117 non-ionic epoxide polyols, which are commercially available from Synthron, Inc.

Generally, the amount of emulsifying agent can be about 0.01 to about 20 weight percent of the aqueous secondary coating composition on a total solids basis, and is more preferably about 0.1 to about 10 weight percent.

Fungicides, bactericides, anti-foaming materials and chlorine-removing catalysts can also be included in the aqueous secondary coating compositions discussed above. Examples of suitable bactericides include potassium cyanide and Biomet 66 antimicrobial compound, which is commercially available from M & T Chemicals of Rahway, N.J. Suitable anti-foaming materials are the SAG materials which are commercially available from OSi Specialties, Inc. of Danbury, Conn. and MAZU DF-136 which is available from PPG Industries, Inc. A non-limiting example of a suitable catalyst for removing chlorine from the aqueous secondary coating composition is urea. The amount of fungicides, bactericides, anti-foaming materials and chlorine-removing catalysts can be about $1 \times 10^{-4}$ to about 5 weight percent of the aqueous secondary coating composition on a total solids basis.

Water (preferably deionized) is included in the aqueous secondary coating compositions discussed above in an amount sufficient to facilitate application of a generally uniform coating upon the strand. The weight percentage of solids of the aqueous secondary coating compositions discussed above generally can be about 5 to about 50 weight percent. Preferably, the weight percentage of solids is about 10 to about 30 weight percent and, more preferably, about 20 to about 30 weight percent.

The aqueous secondary coating compositions of the present invention can be prepared by any suitable method such as conventional mixing well known to those skilled in the art. Preferably the components discussed above are mixed together and the mixture is diluted with water to have the desired weight percent solids.

The application of an aqueous secondary coating composition, such as one of those discussed above, to one or more fiber strand(s) will now be discussed generally.

As shown in FIG. 1, the aqueous secondary coating composition 16 is applied as a secondary layer over a primary layer of an essentially dried residue of a sizing composition 12 which is present on at least a portion of the surface 14 of the fiber strand to protect the surface 14 from abrasion during processing.

Suitable components for the sizing composition will now be discussed. Preferably the sizing composition is aqueous-based and can include film-formers such as starches, thermosetting materials and thermoplastic materials; lubricants; coupling agents; waxes; emulsifiers and water as components, to name a few. Non-limiting examples of suitable sizing compositions are disclosed in K. Loewenstein, *The Manufacturing Technology of Continuous Glass Fibres*, (3d Ed. 1993) at pages 237–289.

Preferably the sizing composition comprises one or more fiber lubricants (discussed in detail below) such as ALU-BRASPIN 226 and CATION X which provide a multilayered hose assembly (discussed in detail below) according to the present invention which has an electrical resistance of greater than about 750 megaohms per 152±13 millimeters (6±0.5 inches) of hose length. The test method for determining the electrical resistance of the hose assembly will be discussed below.

A preferred starch-based sizing composition which includes CATION X lubricant is disclosed in U.S. Pat. No. 3,265,516. Another preferred sizing composition includes about 78 weight percent PLURACOL V-10 polyoxyalkylene polyol (commercially available from BASF Wyandotte of Michigan); about 8 weight percent EMERY 6717 partially amidated polyethylene imine lubricant (commercially available from Henkel Corporation of Kankakee, Ill.) and about 14 weight percent A-1108 aminosilane (commercially available from OSi Specialties, inc. of Danbury Conn.).

As discussed above the sizing composition can include one or more starches including those prepared from potatoes, corn, wheat, waxy maize, sago, rice, milo and mixtures thereof, such as National 1554 (a high viscosity, low amylose crosslinked potato starch) and Hi-Set 369 starches which are commercially available from National Starch and Chemical Corp. of Bridgewater, N.J. and Amaizo starches which are commercially available from American Maize Products Company of Hammond, Ind.

Examples of suitable thermoplastic and thermosetting film-forming materials for use in the sizing composition include acrylic polymers, alkyds, polyepoxides, phenolics, polyamides, polyolefins, polyesters, polyurethanes, vinyl polymers, derivatives and mixtures thereof, to name a few.

Fiber lubricants useful in the present sizing composition include cationic, non-ionic or anionic lubricants and mixtures thereof. Generally, the amount of fiber lubricant can be about 1 to about 15 weight percent of the sizing composition on a total solids basis, preferably about 3 to about 12 weight percent, and more preferably about 5 to about 10 weight percent.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY® 6717, a partially amidated polyethylene imine commercially available from Henkel Corporation of Kankakee, Ill. and Alubraspin 226, which is commercially available from PPG Industries, Inc.

Useful alkyl imidazoline derivatives are CATION X, which is commercially available from Rhone Poulenc of Princeton, N.J. and Alubraspin 261, which is available from PPG Industries, Inc. Other useful lubricants include Alubraspin 227 silylated polyamine polymer lubricant which is manufactured by PPG Industries, Inc., RD-1135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and PROTOLUBE HD high density polyethylene emulsion which is commercially available from Sybron Chemicals of Birmingham, N.J.

The sizing composition can further comprise one or more coupling agents such as organo silane coupling agents, transition metal coupling agents, amino-containing Werner coupling agents and mixtures thereof. These coupling agents typically have dual functionality. Each metal or silicon atom has attached to it one or more groups which can react or compatibilize with the fiber surface and/or the components of the aqueous secondary coating composition. As used herein, the term "compatibilize" means that the groups are chemically attracted, but not bonded, to the fiber surface and/or the components of the sizing composition, for example by polar, wetting or solvation forces. Examples of hydrolyzable groups include:

-continued the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of useful functional organo silane coupling agents include 3-aminopropyldimethylethoxysilane, gamma-aminopropyltriethoxysilane, gamma-aminopropyltrimethoxysilane, beta-aminoethyltriethoxysilane, N-beta-aminoethyl-aminopropyltrimethoxysilane, gamma-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltrimethoxysilane, and chloropropyltriethoxysilane.

Preferred functional organo silane coupling agents include amino silane coupling agents, such as A-1100 and A-1108, each of which are commercially available from OSi Specialties, Inc. of Tarrytown, N.Y. The organo silane coupling agent can be at least partially hydrolyzed with water prior to application to the fibers, preferably at about a 1:1 stoichiometric ratio or, if desired, applied in unhydrolyzed form.

Suitable transition metal coupling agents include titanium, zirconium and chromium coupling agents. Non-limiting examples of suitable titanate coupling agents include titanate complexes such as Ken-React KR-44, KR-34 and KR-38; suitable zirconate coupling agents include Ken React NZ-97 and LZ-38, all of which are commercially available from Kenrich Petrochemical Company. Suitable chromium complexes include Volan which is commercially available from E. I. duPont de Nemours of Wilmington, Del. The amino-containing Werner-type coupling agents are complex compounds in which a trivalent nuclear atom such as chromium is coordinated with an organic acid having amino functionality. Other metal chelate and coordinate type coupling agents known to those skilled in the art can be used herein.

The amount of coupling agent can be 1 to about 5 weight percent of the sizing composition on a total solids basis, and is preferably about 2 to about 3 weight percent.

The sizing composition can further comprise one or more organic acids in an amount sufficient to provide the sizing composition with a pH of about 4 to about 6. Suitable organic acids include mono- and polycarboxylic acids and/or anhydrides thereof, such as acetic, citric, formic, propionic, caproic, lactic, benzoic, pyruvic, oxalic, maleic, fumaric, acrylic, methacrylic acids and mixtures thereof, which are well known to those skilled in the art and are commercially available.

The sizing composition can also include other components such as crosslinking agents, emulsifiers and waxes discussed above. The amounts of such components used in the sizing composition are similar to the amounts set forth above for the secondary coating composition and can be determined by a skilled artisan without undue experimentation.

The primary layer of the sizing composition and secondary layer of the secondary coating composition are applied to fibers, strands, yarns or the like of natural or man-made materials. Fibers believed to be useful in the present invention and methods for preparing and processing such fibers are discussed at length in the *Encyclopedia of Polymer Science and Technology*, Vol. 6 (1967) at pages 505–712, which is hereby incorporated by reference.

Suitable natural fibers include those derived directly from animal, vegetable and mineral sources. Suitable natural inorganic fibers include glass and polycrystalline fibers, such as ceramics including silicon carbide, and carbon or graphite.

The preferred fibers for use in the present invention are glass fibers, a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass fibers are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, "The Manufacturing Technology of Glass Fibres", (3d Ed. 1993) at pages 30–44, 47–60, 115–122 and 126–135, which are hereby incorporated by reference.

Non-limiting examples of suitable animal and vegetable-derived natural fibers include cotton, cellulose, natural rubber, flax, ramie, hemp, sisal and wool. Suitable man-made fibers can be formed from a fibrous or fiberizable material prepared from natural organic polymers, synthetic organic polymers or inorganic substances. As used herein, the term "fiberizable" means a material capable of being formed into a generally continuous filament, fiber, strand or yarn.

Suitable man-made fibers include those produced from natural organic polymers (regenerated or derivative) or from synthetic polymers such as polyamides, polyesters, acrylics, polyolefins, polyurethanes, vinyl polymers, derivatives and mixtures thereof.

Non-limiting examples of useful polyamide fibers include nylon fibers such as are commercially available from E. I. duPont de Nemours and Company of Wilmington, Del., polyhexamethylene adipamide, polyamide-imides and aramids such as KEVLAR™, which is commercially available from duPont.

Thermoplastic polyester fibers useful in the present invention include those formed from polyethylene terephthalate (for example DACRON™ which is commercially available from duPont and FORTREL™ which is commercially available from Hoechst Celanese Corp. of Summit, N.J.) and polybutylene terephthalate. FIRESTONE 3401 polyester fiber, which is commercially available from Firestone of Akron, Ohio, is a preferred fiber for use in the present invention.

Fibers formed from acrylic polymers believed to be useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. A non-limiting example of a suitable acrylic polymer fiber is ORLON™, which is commercially available from duPont.

Useful polyolefin fibers are generally composed of at least 85% by weight of ethylene, propylene, or other olefins.

Fibers formed from vinyl polymers believed to be useful in the present invention can be formed from polyvinyl chloride, polyvinylidene chloride (such as SARAN™, which is commercially available from Dow Plastics of Midland, Mich.), polytetrafluoroethylene, and polyvinyl alcohol (such as VINYLON™, a polyvinyl alcohol fiber which has been crosslinked with formaldehyde).

Further examples of fiberizable materials believed to be useful in the present invention are fiberizable polyimides, polyether sulfones, polyphenyl sulfones; polyetherketones, polyphenylene oxides, polyphenylene sulfides, polyacetals, synthetic rubbers or spandex polyurethanes such as LYCRA™, which is available from duPont.

It is understood that blends or copolymers of any of the above materials and combinations of fibers formed from any of the above materials can be used in the present invention, if desired.

Figure 2:
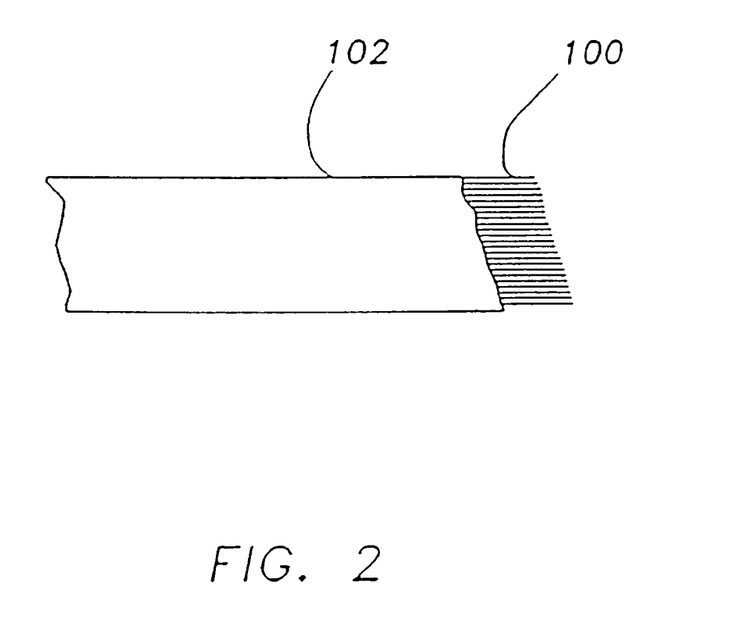
FIG. 2 is an enlarged front elevational view of a plurality of fiber strands coated with an alternative primary coating composition according to the present invention.

Another aspect of the present invention is shown in the alternative embodiment of FIG. 2, in which the fiber strand 100 is formed from a thermoplastic material and/or a thermosetting material such as those discussed above, which preferably is a polyester, and has applied to at least a portion of a surface thereof a primary coating composition 102 comprising a homopolymer of a halogenated vinyl monomer, such as polyvinyl chloride, and a urethane-containing polymer, such as a thermoplastic polyurethane, in amounts such as are disclosed above. The primary coating composition 102 can also include any of the other secondary coating components, lubricants and/or coupling agents discussed above. The primary coating composition 102 can be applied without diluting with water or in an aqueous form by any of the methods discussed below.

The present invention will now be discussed generally in the context of glass fiber strands. However, one of ordinary skill in the art would understand that the aqueous secondary coating compositions of the present invention are useful for coating any of the fibers discussed above.

Suitable apparatus and methods for processing glass fiber strands will be discussed below. For further information, see *Loewenstein* (3d Ed.) at pages 165–172 and 219–222, which are hereby incorporated by reference.

The primary layer of sizing can be applied in many ways, for example by contacting the filaments with a static or dynamic applicator, such as a roller or belt applicator, spraying or other means. The sized fibers are preferably dried at room temperature or at elevated temperatures. The dryer removes excess moisture from the fibers and, if present, cures any curable sizing or secondary coating composition components. The temperature and time for drying the glass fibers will depend upon such variables as the percentage of solids in the sizing composition, components of the sizing composition and type of glass fiber. For example, the forming package can be dried in an oven at a temperature of about 104° C. (220° F.) to about 160° C. (320° F.) for about 10 to about 24 hours to produce glass fiber strands having a dried residue of the composition thereon. The sizing composition is typically present on the fibers in an amount between about 0.1 percent and about 5 percent by weight after drying.

The fibers are gathered into strands and the secondary layer of the secondary coating composition is applied over the primary layer in an amount effective to coat or impregnate the portion of the strands. The secondary coating composition can be conventionally applied by dipping the strand in a bath containing the composition, by spraying the composition upon the strand or by contacting the strand with a static or dynamic applicator such as a roller or belt applicator, for example. The coated strand can be passed through a die to remove excess coating composition from the strand and/or dried as discussed above for a time sufficient to at least partially dry or cure the secondary coating composition. The method and apparatus for applying the secondary coating composition to the strand is determined in part by the configuration of the strand material.

Preferably, the secondary coating composition is applied to the strands by passing the strands through a bath or dip of the secondary coating composition and exposing the fibers to elevated temperatures for a time sufficient to at least partially dry or cure the secondary coating composition. The strand can be "opened up" just before entering the secondary coating composition bath by passing it over a bar or other spreading device which acts to separate the individual fibers from one another. This spreading of the fibers from one another results in a more thorough impregnation of the strand with the composition. Preferably, a die is used to remove excess coating.

The strand is preferably dried after application of the secondary coating composition in a manner well known in the art. For example, the coated strand can be at least partially dried in air at room temperature (about 25° C.) or alternatively in a furnace or oven, preferably above 232° C. (450° F.), to speed the curing process and evaporate the water. A particularly suitable dryer is that disclosed in U.S. Pat. No. 5,197,202, which is hereby incorporated by reference.

The average diameter of the strand is preferably about 0.25 millimeters (about 0.010 inches) to about 3.05 millimeters (about 0.120 inches), and more preferably about 0.51 millimeters (about 0.020 inches) to about 2.03 millimeters (about 0.08 inches).

In an alternative embodiment, a tertiary layer of a tertiary coating composition can be applied to at least a portion of the secondary layer, i.e., such a fiber strand would have a primary layer of sizing, a secondary layer of the secondary coating composition and a tertiary, outer layer of the tertiary coating.

The tertiary coating is different from the sizing composition and the secondary coating composition, i.e., the tertiary coating composition (1) contains at least one component which is chemically different from the components of the sizing and secondary coating composition; or (2) contains at least one component in an amount which is different from the amount of the same component contained in the sizing or secondary coating composition.

For example, the tertiary coating composition can contain a thermoplastic polyurethane and the sizing and secondary coating can contain chemically different thermosetting polyurethanes. In another example, the tertiary coating, secondary coating and sizing can each contain the same thermoplastic polyurethane but in different amounts.

The tertiary coating can be formed from one or more thermoplastic film-forming materials such as polyolefins, polyesters, vinyl polymers and mixtures thereof, such as are discussed in detail above. Preferably, the tertiary coating contains a urethane-containing polymer such as WITCO- BOND® W-290H thermoplastic polyurethane or RUCO-THANE® 2011L thermoplastic polyurethane latex. The tertiary coating can also include conventional stabilizers and other modifiers known in the art of such coatings.

The fiber strands discussed above can be used in a wide variety of applications, but are preferably used as reinforcements for reinforcing multilayered assemblies, such as multi-ply hoses, or polymeric matrix materials, such as polymeric thermoplastic materials and polymeric thermosetting materials.

The reinforced multilayered assembly is preferably generally tubular, although the multilayered assembly can have any shape desired. The generally tubular assembly 20, shown in FIGS. 3 and 4, comprises a first layer or tube 22 formed from a polymeric matrix material, such as the thermoplastic and thermosetting polymeric matrix materials which are discussed below. Preferably, the tube 22 is formed from polyethylene. The tube 22 has an inner surface 24 and an outer surface 26, the inner surface 24 preferably being generally smooth, although the inner surface 24 can have surface irregularities such as protrusions or ridges, if desired.

Figure 3:
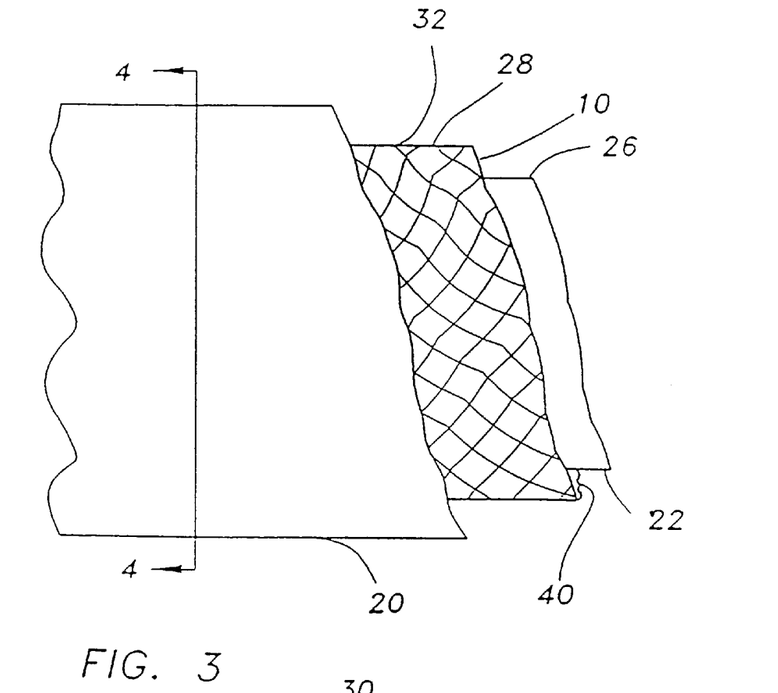
FIG. 3 is a front elevational view of a hose assembly according to the present invention.
Figure 4:
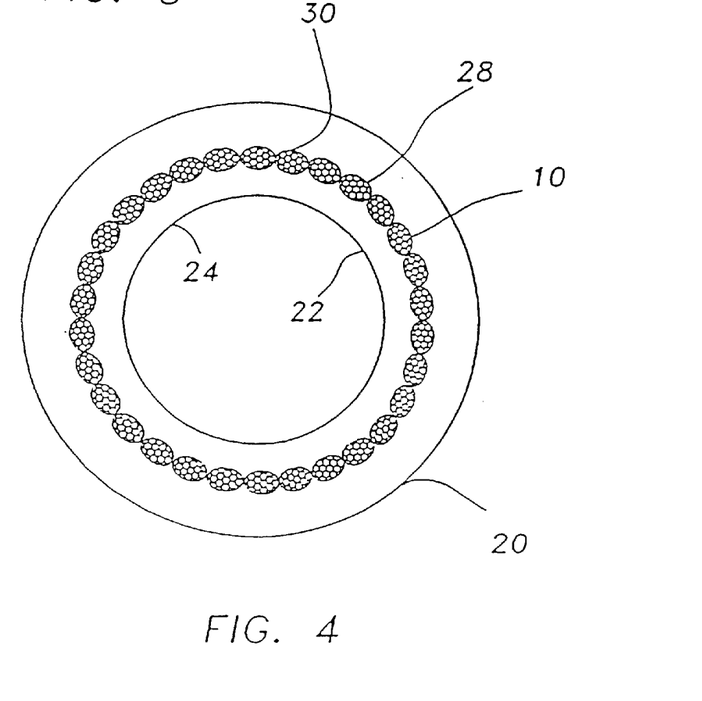
FIG. 4 is a cross-sectional view of the hose assembly of FIG. 3, taken along lines 4—4 of FIG. 3.

The tube 22 is positioned adjacent to, and preferably in contact with a reinforcement layer 28 comprising an assembly 30 of fiber strands 10 having applied thereto a primary layer of a sizing composition 12 and thereupon a secondary layer of an aqueous secondary coating composition 16 according to the present invention as discussed in detail above.

Figure 5:
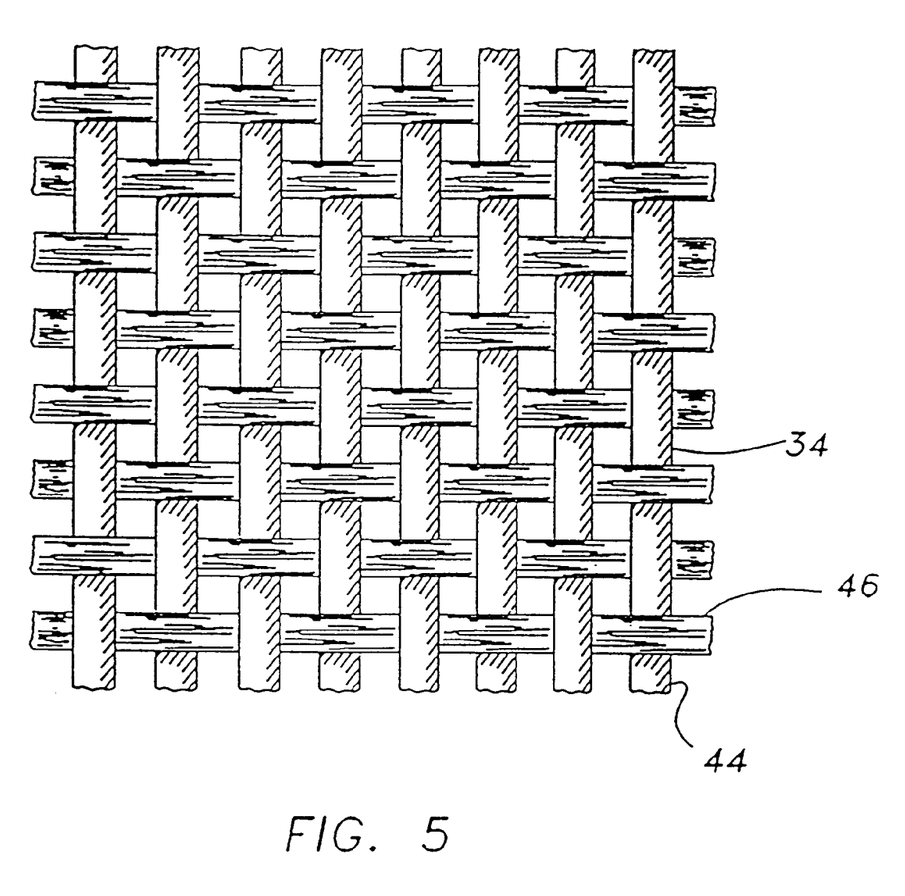
FIG. 5 is a front elevational view of a reinforcement woven mesh of fiber strands according to the present invention.
Figure 6:
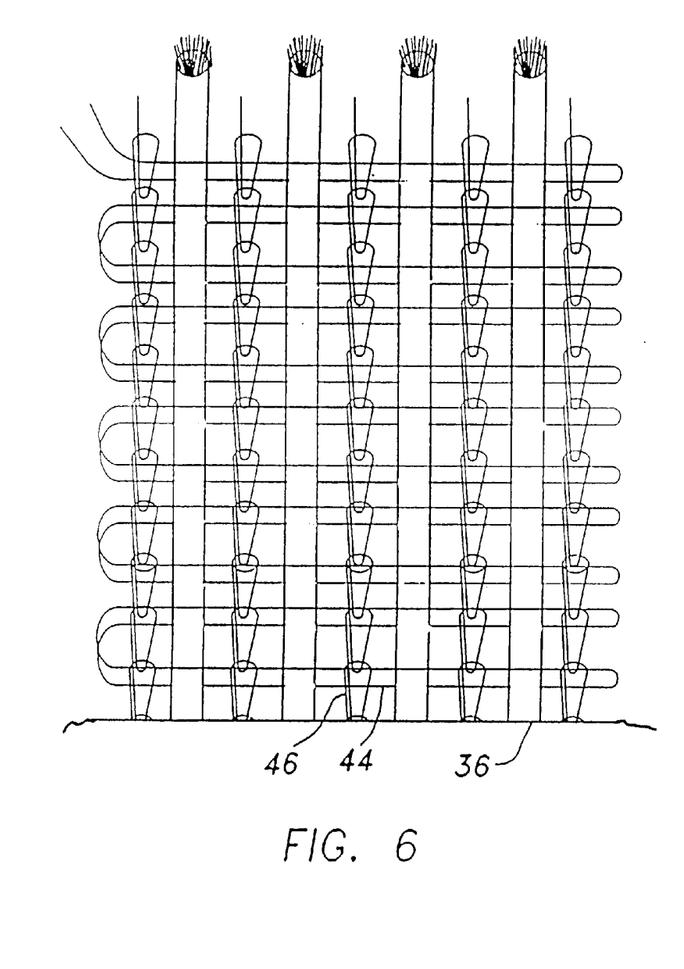
FIG. 6 is a front elevational view of a reinforcement knit fabric of fiber strands according to the present invention.

The assembly 30 of the reinforcement layer 28 is preferably a generally tubular braid 32 (shown in FIGS. 3 and 4), although the assembly 30 can be in the form of a mesh or woven fabric 34 (shown in FIG. 5) or knit fabric 36 which is shown in FIG. 6.

Methods for forming a braided material are well known to those skilled in the art. For further information, see *Textile Terms and Definitions*, The Textile Institute (9th Ed. 1991) at pages 35–36. The braid 32 can include about 5 to about 1000 strands, and preferably about 36 strands. The thickness 40 of the braid 32 is preferably generally equal to the diameter of a strand.

The fabric 34, 36 can be formed using the coated strands of the present invention as warp strands 44 and/or weft strands 46. The warp strands 44 can be twisted prior to secondary coating by any conventional twisting technique known to those skilled in the art, for example by using twist frames. Generally, twist is imparted to the strand by feeding the strand to a bobbin rotating at a speed which would enable the strand to be wound onto the bobbin at a faster rate than the rate at which the strand is supplied to the bobbin. Generally, the strand is threaded through an eye located on a ring which traverses the length of the bobbin to impart twist to the strand, typically about 0.5 to about 3 turns per inch.

The warp strands 44 and weft strands 46 are used to prepare the reinforcing fabric 34, 36. The reinforcing fabric 34, 36 can be formed by knitting or weaving depending upon such factors as the number of warp strands and desired density or width of the fabric. A suitable knit reinforcing fabric 36 can be formed by knitting using any conventional knitting machines well known to those skilled in the art such as a Liba knitting machine or a crochet-type knitting machine which is commercially available from Comez. The reinforcing fabric can alternatively be formed by weaving using any conventional loom, such as a shuttle loom, air jet loom, rapier loom, or other weaving machine. A needle-type loom, such as is commercially available from Muller, is another example of a suitable loom.

The knit construction can be a loop stitch in which the weft strand 46 does not penetrate the warp strand 44, but rather loops to knit adjacent warp strands, as shown in FIG. 6. It is understood that other knitting styles well known to those skilled in the art, such as crochet, can be used to form the reinforcing fabric 36. The weave construction can be a regular plain weave or mesh 34 (shown in FIG. 5), although any other weaving style well known to those skilled in the art, such as a twill weave or satin weave.

Preferably, the reinforcing fabric 34, 36 includes about 5 to about 50 warp strands 44, and more preferably about 12 to about 24 warp strands 44. It is preferred that the reinforcing fabric 36 has about 3 to about 25 picks per centimeter (about 1 to about 15 picks per inch) of the weft strand 46.

The reinforcement layer 28 has an inner surface 48 and an outer surface 50, the inner surface 48 of the reinforcement layer 28 being positioned adjacent to, and preferably in contact with, the outer surface 26 of the first layer 22.

The assembly 20 comprises a second layer 52 formed from a thermoplastic polymeric material such as are discussed below for the matrix material, and is preferably formed from a polyurethane. The second layer 52 is positioned adjacent to, and preferably in contact with, the outer surface 50 of the reinforcement layer 28 to form the generally tubular assembly 20.

One skilled in the art would understand that the first and/or second layers 22, 52 can be preformed and positioned adjacent to the reinforcement layer 28 or formed in situ by coating the inner surface 48 or outer surface 50, respectively, of the reinforcement layer 28 with the selected matrix material.

Also, multiple first layers, multiple reinforcement layers and/or multiple second layers of different materials can be included in the assembly.

The present invention also includes a method of reinforcing a generally tubular assembly. The method comprises (a) forming a generally tubular braid having an inner surface and an outer surface as discussed above, the braid comprising a plurality of coated fiber strands of the present invention; (b) positioning a tube formed from a polymeric material within the braid adjacent the inner surface of the braid; (c) coating the outer surface of the braid with a thermoplastic material to form an outer layer upon the braid; and (d) heating the tube and outer layer to adhere to the braid and form a reinforced generally tubular assembly. Preferably the outer layer is extruded onto the braid.

Another method for reinforcing a generally tubular assembly comprises (a) forming a generally tubular braid having an inner surface and an outer surface as discussed above, the braid comprising a plurality of coated fiber strands of the present invention; (b) coating the inner surface of the braid with a first polymeric material to form an inner layer; and (c) coating the outer surface of the braid with a second polymeric material to form an outer layer, as discussed above. The inner and outer layers can be laminated to the braid.

To determine the resistance of a predetermined length of the hose assembly, a 152±13 millimeters length of hose is capped on its exposed ends to prevent the entry of moisture into the interior of the hose assembly. The hose assembly is exposed to air having a relative humidity of at least 85% at 19° C.±2° C. (75° F.±5° F.) for a period of 168 hours.

After exposure, the surface moisture is removed from the hose assembly. One end of the hose assembly is attached to a source of 60 Hertz sinusoidal, 37.5 kilovolts (rms) of electricity. The other end of the hose assembly is connected to ground through a 1,000–100,000 ohm resistor. A suitable alternating current (AC) voltmeter such as are well known to those skilled in the art is connected across the resistor with a fully shielded cable. For a five (5) minute period, 37.5 kilovolts of electricity are applied to the specimen and the maximum current observed over the period is determined. Leakage in excess of 50 microamperes over the entire length of the hose is not desirable, i.e., the hose assembly preferably has a resistance of greater than about 750 megaohms.

As discussed above, the coated fibers of the present invention are also useful for reinforcing thermoplastic or thermosetting polymeric matrices. Non-limiting examples of suitable polymeric thermoplastic matrix materials include polyolefins such as polyethylene, extended-chain polyethylene, polypropylene, polybutene, polyisoprene, and polypentene, polymethyl pentene, polytetrafluoroethylene and neoprene; polyamides, thermoplastic polyurethanes and thermoplastic polyesters such as are discussed above, vinyl polymers such as polyvinyl chloride, polyvinylidene chloride (saran), polyvinyl fluoride, polyvinylidene fluoride, ethylene vinyl acetate copolymers and polystyrenes; derivatives and mixtures thereof.

Thermoplastic elastomeric materials useful as matrix materials in the present invention include styrene-butadiene rubbers, styrene-acrylontrile (SAN) copolymers, styrene-butadiene-styrene (SBS) copolymers and acrylonitrile-butadiene-styrene (ABS) copolymers.

Further examples of useful thermoplastic materials include polyimides, polyether sulfones, polyphenyl sulfones, polyetherketones, polyphenylene oxides, polyphenylene sulfides, polyacetals, polyvinyl chlorides and polycarbonates. Also included as suitable thermoplastic materials are any of the above thermoplastics which are modified by an unsaturated monomer.

Matrix materials useful in the present invention can include thermosetting materials such as thermosetting polyesters, vinyl esters, epoxies (containing at least one epoxy or oxirane group in the molecule, such as polyglycidyl ethers of polyhydric alcohols or thiols), phenolics, aminoplasts, thermosetting polyurethanes, derivatives and mixtures thereof.

Other components which can be included with the polymeric matrix material and reinforcing material in the composite are, for example, colorants or pigments, lubricants or process aids, ultraviolet light (UV) stabilizers, antioxidants, other fillers, and extenders.

The fiber strand reinforcing material can be dispersed in the matrix by hand or any suitable automated feed or mixing device which distributes the reinforcing material generally evenly throughout the polymeric matrix material. For example, the reinforcing material can be dispersed in the polymeric matrix material by dry blending all of the components concurrently or sequentially.

Figure 7:
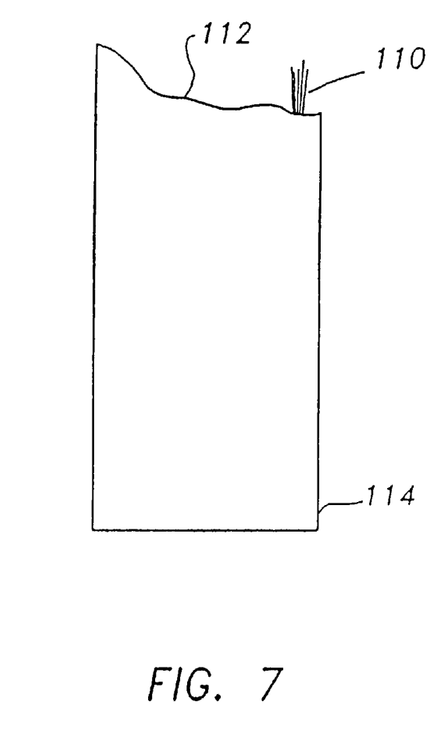
FIG. 7 is a front elevational view of a composite, partially broken away to show a strand according to the present invention.

The polymeric matrix material 112 and strand 110 can be formed into a composite 114, shown in FIG. 7, by a variety of methods which are dependent upon such factors as the type of polymeric matrix material used. Thermosetting polymeric matrix materials can be cured by the inclusion of crosslinkers in the matrix material and/or by the application of heat, for example. Suitable crosslinkers useful to crosslink the polymeric matrix material are discussed above. The temperature and curing time for the thermosetting polymeric matrix material depends upon such factors as the type of polymeric matrix material used, other additives in the matrix system and thickness of the composite, to name a few.

Reinforced polymeric composites can be formed from the polymeric matrix material, reinforcing material and any other desired components in a variety of ways. For example, for a thermosetting matrix material, the composite can be formed by compression or injection molding, pultrusion, filament winding, hand lay-up, spray-up or by sheet molding or bulk molding followed by compression or injection molding. For a thermoplastic matrix material, suitable methods for forming the composite include direct molding or extrusion compounding followed by injection molding. Useful extrusion equipment includes single or twin screw extruders commercially available from Werner Pfleiderer and Welding Engineers, respectively. Methods and apparatus for forming the composite by the above methods is discussed in I. Rubin, *Handbook of Plastic Materials and Technology* (1990) at pages 955–1062, 1179–1215 and 1225–1271, which are hereby incorporated by reference.

The method according to the present invention for reinforcing a polymeric matrix material comprises: (1) applying to a sized fiber strand reinforcing material the above aqueous secondary coating composition; (2) drying the aqueous secondary coating composition to form a substantially uniform coating upon the reinforcing material; (3) dispersing the reinforcing material in the polymeric matrix material; and (4) at least partially curing the polymeric matrix material to provide a reinforced polymeric composite in a manner such as is discussed in detail above.

The present invention will now be illustrated by the following specific, non-limiting examples.

EXAMPLE 1

A six gallon mixture of the aqueous sizing composition of Table 1 was prepared, applied as a primary layer to single strand bundles (1600 filaments per strand) and four strand bundles of H-15 E-glass fibers and the bundles were wound onto individual forming packages in a manner similar to that discussed above in the specification. The weight of sizing composition on the fibers after drying the forming package at a temperature of about 100° C. for about 10 hours was about 0.7 weight percent.

TABLE 1

| Sizing Component | Weight Percent of Component |
| --- | --- |
| PLURACOL V-10 polyoxyalkylene polyol[1] | 78 |
| EMERY 6717 partially amidated polyethylene imine lubricant[2] | 8 |
| A-1108 aminosilane[3] | 14 |

Samples A1 (single strand) and A2 (four strand) were prepared by coating the above strands with a secondary layer of the secondary coating composition set forth in Table 2 below. Corresponding Controls A1 and A2 were prepared from the sized strand without secondary coating.

TABLE 2

| Secondary Coating Component | Weight of Component (grams) |
| --- | --- |
| VYCAR ™ 552 polyvinyl chloride/nitrile rubber copolymer latex[4] | 12,000 |
| Rucothane 2011L polyurethane[5] | 2362 |
| urea | 20 |
| MAZU DF-136 defoamer[6] | 12 |
| deionized water | 10,000 |

[1]PLURACOL V-10 polyoxyalkylene polyol is commercially available from BASF Wyandotte of Michigan.

TABLE 2-continued

| Secondary Coating Component | Weight of Component (grams) |
| --- | --- |

[2]EMERY 6717 partially amidated polyethylene imine lubricant is commercially available from Henkel Corporation of Kankakee, Illinois.
[3]A-1108 aminosilane is commercially available from OSi Specialties, Inc. of Danbury, Connecticut.
[4]VYCAR ™ 552 polyvinyl chloride/nitrile rubber copolymer latex is commercially available from B. F. Goodrich of Cleveland, Ohio.
[5]RUCOTHANE ® 2011L thermoplastic polyurethane latex is commercially available from Ruco Polymer Corp. of Hicksville, New York.
[6]MAZU DF-136 defoamer is available from PPG Industries, Inc.

The secondary aqueous coating composition was applied to the sized glass fibers by drawing the glass fibers through a bath of the coating and a die to remove excess coating, such that the loss on ignition (LOI) of the coated glass strand was about 14 percent. The diameter of the passage through the die for the strand samples prepared was about 0.56 millimeters (0.022 inches).

Evaluation of Sample A1 for Electrical Resistance at 37.5 kilovolts:

A hose assembly was prepared by braiding thirty-six of the above Sample A1 strands to form a generally tubular reinforcement layer having a thickness generally equal to a single layer of strand. The reinforcement layer was coated with an inner layer of polyethylene about 1 millimeter thick and an outer layer of polyurethane about 1 millimeter thick. A 152.4 millimeter (six inch) length of the hose assembly was evaluated for electrical resistance by the method discussed in detail above using 37.5 kilovolts. The electrical resistance of this sample was less than 750 megaohms. According to this test protocol, this hose assembly did not pass the test standards for this particular end use application as a pneumatic hose, however this assembly can be useful for other hose assembly or reinforcement applications.

EXAMPLE 2

Samples B1 and B2 were prepared by coating single strands of K-18 (800 filaments per strand having a twist of 1 turn per 3 inches) and G-37 (400 filaments per strand having a twist of 1 turn per 4 inches), which are commercially available as 610 product[7] from PPG Industries, Inc. of Pittsburgh, Pa., respectively, with a secondary layer of the secondary coating composition set forth in Table 2 above. Controls B1 and B2 were prepared from the corresponding sized 610 product strands without secondary coating.

[7] The 610 product is produced according to U.S. Pat. No. 3,265,516 and includes about 60 weight percent of about a 5:1 mixture of NATIONAL 1554 and AMAIZO 2213 starches; about 25 weight percent ECLIPSE 102 oil; about 10 weight percent MACOL E-300 polyethylene glycol, which is available from PPG Industries, Inc.; and less than 5 weight percent each of TMAZ 81 emulsifier which is also available from PPG industries, diglycol monostearate, CATION X lubricant and CHEMTREAT CL-2141 biocide, the commercial sources of which are discussed above in the specification.

Relative Electrical Resistance of Samples and Controls

The electrical resistance of strands of the above Samples and Controls, as well as the electrical resistance of uncoated Firestone 3401 polyester strand (Control C) and Firestone 3401 strand coated with the secondary coating of Table 2 (Sample C) was determined by applying 60 volts of direct current (DC) electricity to one inch long bundles of 60 strands of each of the above Samples and Controls. The averages for electrical resistance of ten runs for each Sample and Control are presented in Table 3 below.

TABLE 3

| Example | Average Resistance (megaohms) |
| --- | --- |
| Sample A1 | 656 |
| Control A1 | 30,100 |
| Sample A2 | 412 |
| Control A2 | 30,500 |
| Sample B1 | 4410 |
| Control B1 | 126,000 |
| Sample B2 | 7510 |
| Control B2 | 135,00 |
| Sample C | 2640 |
| Control C | 379,000 |

As shown in Table 3 above, while Samples A1, A2, B1 and B2 have the same secondary coating, Samples B1 and B2, which are coated with a starch-based sizing composition prepared according to U.S. Pat. No. 3,265,516, have relatively higher values of electrical resistance as compared to Samples A1 and A2, which are coated with the sizing of Table 1. It is believed that the improved electrical resistance of Samples B1 and B2 can be attributed at least in part to the lubricant in the sizing composition (CATION X alkyl imidazoline reaction product of tetraethylene pentamine and stearic acid) over Samples A1 and A2 which include EMERY 6717 partially amidated polyethylene imine lubricant in the sizing composition.

The sized strands coated with the secondary coating composition of Table 2 were believed to provide improved adhesion when laminated to the inner and outer layers of the hose assembly discussed above.

EXAMPLE 3

The aqueous sizing composition of Table 1 was applied as a primary layer to double strand bundles and four strand bundles of H-15 E-glass fibers and the bundles were wound onto individual forming packages and dried as described in Example 1 above.

Samples D1 (double strand) and D2 (four strand) were prepared by coating the above strands with a secondary layer of the secondary coating composition set forth in Table 4 below having about 35 weight percent solids. Corresponding Controls D1 and D2 were prepared from the sized strand without secondary coating.

TABLE 4

| Secondary Coating Component | Weight of Component (grams) |
| --- | --- |
| VYCAR ™ 576 polyvinyl chloride emulsion[8] | 12,136 |
| RHOPLEX E-32 acrylic emulsion[9] | 3750 |
| PETROLITE 75 wax[10] | 1500 |
| MAZU DF-136 defoamer[11] | 10 |
| urea | 15 |
| deionized water | 750 |

[8]VYCAR ™ 576 polyvinyl chloride emulsion plasticized with di-2-ethyl hexyl phthalate is commercially available from B. F. Goodrich of Cleveland, Ohio.
[9]RHOPLEX E-32 acrylic emulsion is commerically available from Rohm and Haas Company of Philadelphia, PA.
[10]PETROLITE 75 wax is commercially available from Michelman Inc.
[11]MAZU DF-136 defoamer is available from PPG Industries, Inc.

The secondary aqueous coating composition was applied to the sized glass fibers by drawing the glass fibers through a bath of the coating and a die to remove excess coating, such that the loss on ignition (LOI) of the coated glass strand was about 14 percent. The diameter of the passage through the die for the strand samples prepared was about 0.81 millimeters (0.032 inches) for Sample D1 and Control D1 and about 1.1 millimeters (0.044 inches) for Sample D2 and Control D2.

EXAMPLE 4

The aqueous sizing composition of Table 1 was applied as a primary layer to four strand bundles of H-15 E-glass fibers and the bundles were wound onto individual forming packages and dried as described in Example 1 above.

Samples E1 and E2 were prepared by coating the above strands with a secondary layer of the secondary coating composition set forth in Table 5 below having about 37 weight percent solids. Corresponding Controls E1 and E2 were prepared from the sized strand without secondary coating.

TABLE 5

| Secondary Coating Component | Weight of Component (grams) |
| --- | --- |
| VYCAR ™ 590X20 polyvinyl chloride/ acrylic copolymer emulsion[12] | 16,000 |
| MAZU DF-136 defoamer[13] | 20 |
| urea | 20 |
| deionized water | 2700 |

[12]VYCAR ™ 590X20 polyvinyl chloride/acrylic copolymer emulsion is commercially available from B. F. Goodrich of Cleveland, Ohio.
[13]MAZU DF-136 defoamer is available from PPG Industries, Inc.

The secondary aqueous coating composition was applied to the sized glass fibers by drawing the glass fibers through a bath of the coating and a die to remove excess coating, such that the loss on ignition (LOI) of the coated glass strand for Sample E1 and Control E1 was about 14 percent for the diameter of the passage through the die of about 1.1 millimeters (0.044 inches) and the LOI for Sample E1 and Control E1 was about 16.3 for the diameter of the passage through the die of about 1.17 millimeters (0.046 inches).

EXAMPLE 5

The aqueous sizing composition of Table 1 was applied as a primary layer to two strand and four strand bundles of H-15 E-glass fibers and the bundles were wound onto individual forming packages and dried as described in Example 1 above.

Samples F1 (two strand) and F2 (four strand) were prepared by coating the above strands with a secondary layer of the secondary coating composition set forth in Table 6 below having about 40 weight percent solids. Corresponding Controls F1 and F2 were prepared from the sized strand without secondary coating.

TABLE 6

| Secondary Coating Component | Weight of Component (grams) |
| --- | --- |
| VYCAR ™ 590X20 polyvinyl chloride/ acrylic copolymer emulsion[14] | 16,000 |
| RHOPLEX E-32 acrylic emulsion[15] | 2416 |
| PETROLITE 75 wax[16] | 556 |
| MAZU DF-136 defoamer[17] | 20 |

TABLE 6-continued

| Secondary Coating Component | Weight of Component (grams) |
| --- | --- |
| urea | 20 |
| deionized water | 3200 |

[14]VYCAR ™ 590X20 polyvinyl chloride/acrylic copolymer emulsion is commercially available from B. F. Goodrich of Cleveland, Ohio.
[15]RHOPLEX E-32 acrylic emulsion is commerically available from Rohm and Haas Company of Philadelphia, PA.
[16]PETROLITE 75 wax is commercially available from Michelman Inc.
[17]MAZU DF-136 defoamer is available from PPG Industries, Inc.

The secondary aqueous coating composition was applied to the sized glass fibers by drawing the glass fibers through a bath of the coating and a die to remove excess coating, such that the loss on ignition (LOI) of the coated glass strand for Samples F1 and F2 and Controls F1 and F2 was about 15 percent for the diameter of the passage through the die of about 0.81 millimeters (0.032 inches).

EXAMPLE 6

The aqueous sizing composition of Table 1 was applied as a primary layer to four strand bundles of H-15 E-glass fibers and the bundles were wound onto individual forming packages and dried as described in Example 1 above.

Sample G (four strand) was prepared by coating the above strands with a secondary layer of the secondary coating composition set forth in Table 7 below having about 40 weight percent solids. Corresponding Control G was prepared from the sized strand without secondary coating.

TABLE 7

| Secondary Coating Component | Weight of Component (grams) |
| --- | --- |
| VYCAR ™ 552 polyvinyl chloride/ nitrile rubber copolymer latex[18] | 16,000 |
| MAZU DF-136 defoamer[19] | 15 |
| urea | 18 |
| deionized water | 6000 |

[18]VYCAR ™ 552 polyvinyl chloride/nitrile rubber copolymer latex is commercially available from B. F. Goodrich of Cleveland, Ohio.
[19]MAZU DF-136 defoamer is available from PPG Industries, Inc.

The secondary aqueous coating composition was applied to the sized glass fibers by drawing the glass fibers through a bath of the coating and a die to remove excess coating, such that the loss on ignition (LOI) of the coated glass strand for Sample G and Control G was about 16.7 percent for the diameter of the passage through the die of about 1.17 millimeters (0.046 inches).

EXAMPLE 7

The aqueous sizing composition of Table 1 was applied as a primary layer to a one strand bundle of H-15 E-glass fibers and the bundle was wound onto individual forming packages and dried as described in Example 1 above.

Sample H (one strand) was prepared by coating the above strands with a secondary layer of the secondary coating composition set forth in Table 8 below having about 40 weight percent solids. Corresponding Control H was prepared from the sized strand without secondary coating.

TABLE 8

| Secondary Coating Component | Weight of Component (grams) |
|---|---|
| VYCAR ™ 580X83 polyvinyl chloride emulsion[20] | 16,000 |
| MAZU DF-136 defoamer[21] | 12 |
| urea | 18 |
| deionized water | 6000 |

[20]VYCAR ™ 580X83 polyvinyl chloride emulsion which is plasticized with di-isodecyl phthalate is commercially available from B. F. Goodrich of Cleveland, Ohio.
[21]MAZU DF-136 defoamer is available from PPG Industries, Inc.

The secondary aqueous coating composition was applied to the sized glass fibers by drawing the glass fibers through a bath of the coating and a die to remove excess coating, such that the loss on ignition (LOI) of the coated glass strand for Sample H and Control H was about 19 percent for the diameter of the passage through the die of about 0.66 millimeters (0.026 inches).

From the foregoing description, it can be seen that the present invention provides secondary coatings for fiber strands having improved adhesion to inner or outer layers of a hose assembly or a polymeric matrix, such as polyurethanes. The present invention provides a simple, economical hose assembly having one or more of the following performance characteristics such as high tensile strength, high modulus of elasticity, resin compatibility, dielectric properties to provide electrical resistance, environmental stability and cost effectiveness. The present invention also provides a hose assembly having good tensile and compressive strength which is capable of withstanding the rigorous environment to which such hose assemblies are subjected.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. A fiber strand having applied to at least a portion of a surface thereof a primary layer of a sizing composition and thereupon a secondary layer of an aqueous secondary coating composition different from the sizing composition, the secondary coating composition comprising:
   (a) a blend of (1) a halogenated vinyl polymer; and (2) an elastomeric polymer, the blend being essentially free of a monoolefinic material; and
   (b) a urethane-containing polymer chemically different from the elastomeric polymer.

2. The fiber strand according to claim 1, wherein the fiber strand is formed from a material selected from the group consisting of inorganic materials, natural materials, thermoplastic materials and thermosetting materials.

3. The fiber strand according to claim 2, wherein the fiber strand is formed from an inorganic material which comprises glass fibers.

4. The fiber strand according to claim 2, wherein the fiber strand is formed from a thermoplastic material which comprises polyester fibers.

5. The fiber strand according to claim 1, wherein the sizing composition is present as an at least partially dried residue upon the portion of the surface of the fiber strand.

6. The fiber strand according to claim 1, wherein the secondary coating composition is present as an at least partially dried residue upon the primary layer of the fiber strand.

7. The fiber strand according to claim 1, wherein the halogenated vinyl polymer of the secondary coating composition is a polymerization reaction product of halogenated vinyl monomers selected from the group consisting of vinyl chloride, vinyl fluoride, vinylidene chloride, vinylidene fluoride and mixtures thereof.

8. The fiber strand according to claim 1, wherein the elastomeric polymer of the secondary coating composition is selected from the group consisting of polyisoprene, polybutadiene, styrene-butadiene copolymers, acrylonitrile-butadiene copolymers, styrene-butadiene-vinylpyridine terpolymers, fluorinated elastomers, polysulfides, silicone rubbers, polyacrylates, polychloroprenes and polyurethanes which are chemically different from the urethane-containing polymer (b).

9. The fiber strand according to claim 8, wherein the elastomeric polymer is an acrylonitrile-butadiene copolymer.

10. The fiber strand according to claim 1, wherein the blend (a) of the secondary coating composition contains less than about 5 weight percent of a monoolefinic material.

11. The fiber strand according to claim 1, wherein the blend (a) of the secondary coating composition comprises about 50 to about 99 weight percent of the secondary coating composition on a total solids basis.

12. The fiber strand according to claim 1, wherein the urethane-containing polymer of the secondary coating composition comprises about 5 to about 50 weight percent of the secondary coating composition on a total solids basis.

13. The fiber strand according to claim 1, wherein the secondary coating composition further comprises a wax material.

14. The fiber strand according to claim 1, further comprising a tertiary layer present upon at least a portion of the secondary layer, the tertiary layer comprising a tertiary coating composition which is different from the secondary coating composition and the sizing composition.

15. The fiber strand according to claim 14, wherein the tertiary coating composition comprises a thermoplastic urethane-containing polymer.

* * * * *